July 25, 1944.  W. G. MARTIN  2,354,533
TANK FITTING
Filed Jan. 29, 1942
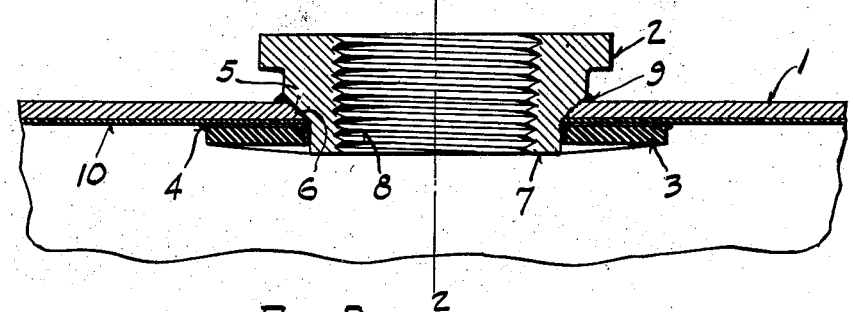
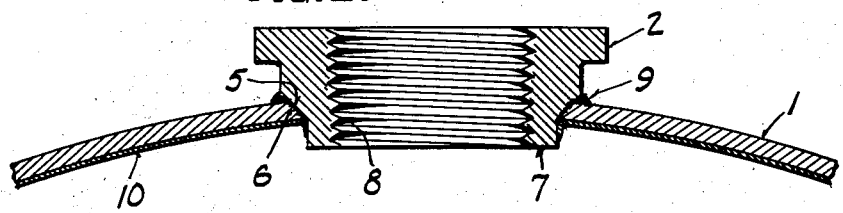
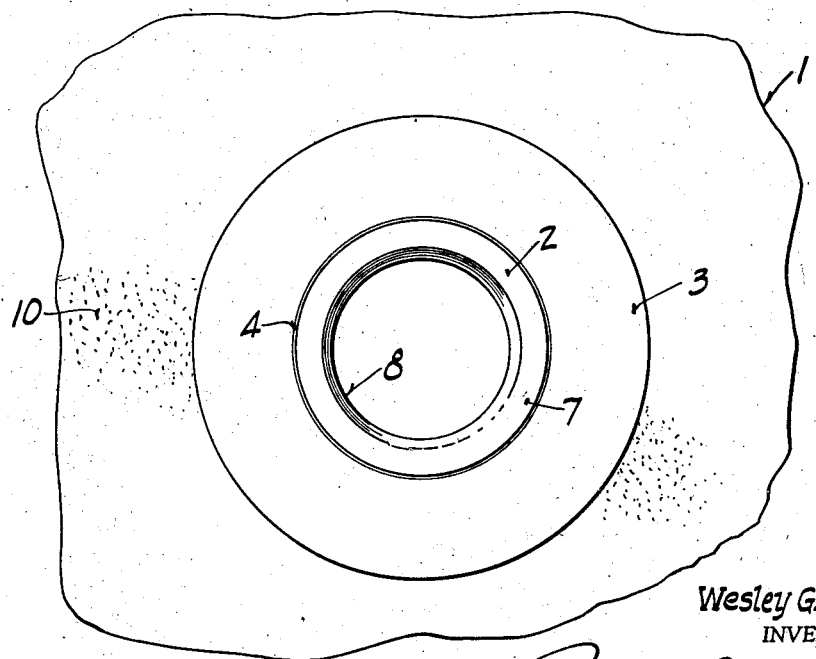
Wesley G. Martin
INVENTOR.
BY
ATTORNEY.

Patented July 25, 1944

2,354,533

UNITED STATES PATENT OFFICE 2,354,533

TANK FITTING

Wesley G. Martin, Milwaukee, Wis., assignor to A. O. Smith Corporation, Milwaukee, Wis., a corporation of New York Application January 29, 1942, Serial No. 428,649

1 Claim. (Cl. 285—49)

This invention relates to a tank fitting for a lined tank or other lined tubular member. The fitting is suitable for piping connections or other attachments.

The principal object of the invention is to improve and simplify the protecting of the metal wall of the tank adjacent the fitting from corrosion.

Other objects of the invention will become apparent from the following description and accompanying drawing illustrating an embodiment of the invention.

In the drawing:

Figure 1 is a longitudinal section of a portion of a tank shell and a tank fitting;

Fig. 2 is a section taken on line 2—2 of Fig. 1 showing the shell and fitting prior to the application of the protecting washer; and Fig. 3 is an inner end view of the fitting as applied to the tank.

Referring to the drawing, there is illustrated a shell 1 of a hot water tank having a fitting secured therein comprising a spud 2 of corrosion resistant metal, an annular ring or washer 3 of rubber or metal or the like to be slipped over the inner end of the spud, and cementing material 4 to secure the ring to the interior surface of the shell 1 and to the spud 2.

The interior of the spud 2 is generally cylindrical and threaded and the outside surface of the outer end portion 5 is frustro-conical shaped and of a sufficient diameter to tightly engage the edge of the opening 6 provided in the wall of the shell. The inner end of the spud 2 constitutes a thin projecting skirt 7.

The screw threads 8 are disposed internally of the spud to readily adapt it for the threading in of piping connections or other attachments.

The spud 2 is preferably made of alloy or other material suitable for welding to the tank and adapted to resist corrosion by the fluids contained in the tank in service.

In assembling the spud 2 with the shell 1, an opening 6 is first provided in the wall of the shell of sufficient diameter to permit insertion of the spud 2 therein. The spud 2 is next disposed in the opening 6 with the skirt 7 projecting into the tank a slight distance and with the conical surface of the outer end portion 5 disposed against the edge of the opening 6 in a substantially close fit. The body portion 5 of the spud is then secured to the edge of the opening 6 of the shell 1 by the weld 9. The weld 9 is preferably made by electric resistance welding, although other types of welding or manner of attachment of the spud to the shell may be employed.

Ceramic enamel or other suitable material is next applied and fused under high temperatures to the interior surface of the shell 1 to provide the corrosion resistant lining 10 before the heads are applied to the shell 1. The skirt 7 projecting inside the tank is readily accessible through the end of the shell. Working through one of these ends, the skirt 7 of the spud 2 and a substantial area of the lining 10 surrounding the skirt is covered with the cementing material 4. This material is preferably a rubber cement with considerable adhesive qualities and resistant to corrosion by the contained fluid when the tank is in service.

After applying the cement 4 and before the setting thereof the annular ring 3 is slipped over the skirt 7 of the spud 2 and pressed to a position of tight engagement with the inner surface of the shell 1. The ring is maintained in this position until the rubber cement 4 sets sufficiently to bond or glue the ring 3 to the inner surface of the shell 1.

The ring 3 is preferably made of synthetic rubber that is resistant to corrosion and the central opening therein is of a diameter slightly less than that of the skirt 7 of the spud 2 so that the tensile forces in the rubber ring will be employed to grip the skirt 7. This gripping force of the ring 3 is particularly effective during the period the rubber cement 4 is setting, although upon the setting of the cement this force acts in combination with the cement 4 to hold the ring 3 in tight engagement with the inner surface of the shell 1 and in similar engagement with the outer surface of the skirt 7. The rubber ring 3 is also of a pliable nature to readily conform to the contour of the wall of the shell 1.

The ring 3 prevents any circulation or seepage of fluid to any exposed metal at the juncture between the spud 2 and the shell 1. Should the lining 10 adjacent the spud 2 become injured by the threading of a pipe into the spud, the rubber ring overlies the injured part and prevents corrosion of the metal beneath.

Although the description of the invention has been limited to its employment with the shells of ceramic enamel lined hot water tanks the invention may readily be applied to the heads of hot water tanks as well. The invention also may be utilized with any lined tubular members such as lined pipes.

Various embodiments of the invention may be employed within the scope of the accompanying claim.

I claim:

A fitting for the shell of a hot water tank having a ceramic enamel lining to resist corrosion and an opening in the wall thereof to receive the fitting, said fitting comprising a corrosion resistant metal spud having one end secured to the edge of said opening and the other end projecting within said tank, a washer of corrosion resistant material disposed around the projecting end of the spud in tight engagement with the interior surface of said tank, said washer being pliable to conform to the contour of the wall of the tank and having a central opening with a diameter slightly less than that of the projecting end of said spud to provide a tight grip of said end by said washer when assembled together, and corrosion resistant cementing material constituting the sole means for securing the washer to the spud and to the inner surface of said tank and preventing exposure of the metal at the juncture of the tank and spud to the contents of the tank.

WESLEY G. MARTIN.